United States Patent
Song et al.

(10) Patent No.: US 12,449,570 B2
(45) Date of Patent: Oct. 21, 2025

(54) PATTERN FILM, METHOD FOR MANUFACTURING PATTERN FILM, AND TRANSMITTANCE VARIABLE DEVICE COMPRISING SAME

(71) Applicant: LG Chem, Ltd., Seoul (KR)

(72) Inventors: Cheolock Song, Daejeon (KR); Han Min Seo, Daejeon (KR); Nam Seok Bae, Daejeon (KR); Jiehyun Seong, Daejeon (KR); Seung Heon Lee, Daejeon (KR); Minjun Gim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 630 days.

(21) Appl. No.: 17/792,470

(22) PCT Filed: Feb. 4, 2021

(86) PCT No.: PCT/KR2021/001474
§ 371 (c)(1),
(2) Date: Jul. 13, 2022

(87) PCT Pub. No.: WO2021/167272
PCT Pub. Date: Aug. 26, 2021

(65) Prior Publication Data
US 2023/0059263 A1    Feb. 23, 2023

(30) Foreign Application Priority Data
Feb. 18, 2020 (KR) .................. 10-2020-0019601

(51) Int. Cl.
*G02B 5/00* (2006.01)
(52) U.S. Cl.
CPC .................. *G02B 5/003* (2013.01)

(58) Field of Classification Search
CPC ........ G02B 5/003; G02B 5/1847; G02B 5/18; G02B 5/3016; G02F 1/1335
See application file for complete search history.

(56) References Cited

U.S. PATENT DOCUMENTS

| 4,396,250 A | 8/1983 | Wada et al. |
| 7,936,437 B2 | 5/2011 | Hong et al. |
| (Continued) | | |

FOREIGN PATENT DOCUMENTS

| EP | 0022311 A1 | 1/1981 |
| JP | 2002014772 A | 1/2002 |
| (Continued) | | |

OTHER PUBLICATIONS

Lee et al., KR10-1273890B, machine translation, Aug. 2007 (Year: 2007).*

(Continued)

*Primary Examiner* — Tracie Y Green
(74) *Attorney, Agent, or Firm* — Lerner David LLP

(57) ABSTRACT

A pattern film, a method for manufacturing a pattern film, and a transmittance variable device comprising the same are disclosed herein. In some embodiments, a pattern film includes a base layer, and a spacer pattern formed on the base layer, the spacer pattern comprises a partition wall spacer comprises a plurality of spacer dots and a spacer line connecting the spacer dots, and a ball spacer, the ball spacer is one of embedded in, partially embedded in, or in contact with the partition wall spacer, when any 3 or more spacer dots are selected, the spacer line forms a closed figure having the selected spacer dots at the vertices thereof, the selected spacer dots are not present inside the closed figure, a length of at least one side of the closed figure is different from lengths of the remaining sides, and each spacer dot has irregularity of 50% or greater.

12 Claims, 17 Drawing Sheets

(56) References Cited

U.S. PATENT DOCUMENTS

| | | | |
|---|---|---|---|
| 8,891,156 B2 | 11/2014 | Yang et al. | |
| 9,035,198 B2 | 5/2015 | Hwang et al. | |
| 10,509,273 B2 | 12/2019 | You et al. | |
| 11,338,499 B2 | 5/2022 | Song et al. | |
| 11,874,564 B2 * | 1/2024 | Song | G02F 1/1347 |
| 2013/0069258 A1 | 3/2013 | Ballet et al. | |
| 2020/0150478 A1 | 5/2020 | Seo et al. | |
| 2020/0159058 A1 | 5/2020 | Song et al. | |
| 2020/0362623 A1 | 11/2020 | Bae et al. | |

FOREIGN PATENT DOCUMENTS

| | | | |
|---|---|---|---|
| JP | 2002148636 | A | 5/2002 |
| JP | 2008170633 | A | 7/2008 |
| JP | 2013530423 | A | 7/2013 |
| JP | 2015508910 | A | 3/2015 |
| JP | 202024267 | A | 2/2020 |
| KR | 20080081426 | A | 9/2008 |
| KR | 101273890 | B1 | 6/2013 |
| KR | 101367135 | B1 | 2/2014 |
| KR | 101379963 | B1 | 4/2014 |
| KR | 101432574 | B1 | 8/2014 |
| KR | 20160100575 | A | 8/2016 |
| KR | 20160146566 | A | 12/2016 |
| KR | 20170024745 | A | 3/2017 |
| KR | 20190019843 | A | 2/2019 |
| KR | 20190122579 | A | 10/2019 |
| KR | 102068304 | B1 | 2/2020 |
| TW | 201348832 | A | 12/2013 |
| WO | 2011144852 | A1 | 11/2011 |
| WO | 2015008758 | A1 | 1/2015 |
| WO | 2019022564 | A1 | 1/2019 |
| WO | 2019022565 | A1 | 1/2019 |

OTHER PUBLICATIONS

Song et al. KR20190019843A, machine translation 2019 (Year: 2019).*

Yu, KR10-2016-0146566, machine-translation, Dec. 2016 (Year: 2016).*

International Search Report for Application No. PCT/KR2021/001474 mailed May 25, 2021, pp. 1-4.

* cited by examiner (Mesh pattern)

(Honeycomb pattern)

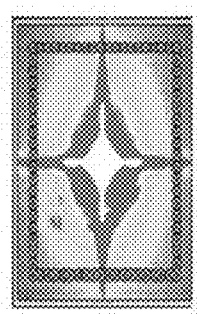 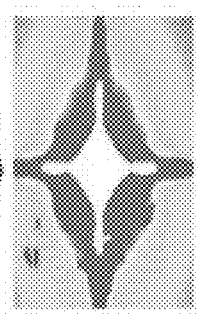 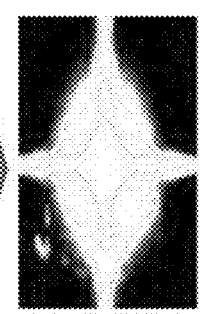
FIG. 6A    FIG. 6B    FIG. 6C
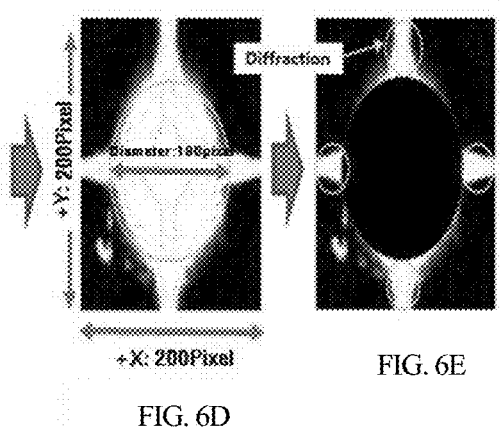
FIG. 6D    FIG. 6E

PATTERN FILM, METHOD FOR MANUFACTURING PATTERN FILM, AND TRANSMITTANCE VARIABLE DEVICE COMPRISING SAME

CROSS-REFERENCE TO RELATED APPLICATIONS

This application is a national phase entry under 35 U.S.C. § 371 of International Application No. PCT/KR2021/001474, filed on Feb. 4, 2021, which claims priority from Korean Patent Application No. 10-2020-0019601, filed on Feb. 18, 2020, the entire contents of which are incorporated by reference herein.

TECHNICAL FIELD

The present specification relates to a pattern film, a method for manufacturing a pattern film, and a transmittance variable device comprising the same.

BACKGROUND ART

A transmittance variable device may mean a functional film capable of adjusting transmittance of sunlight.

A transmittance variable device means a device capable of switching between at least two or more different states. Such a device is used in, for example, eyewear such as glasses or sunglasses, mobile devices, wearable devices such as devices for virtual reality (VR) or devices for augmented reality (AR), or vehicular sunroofs, and the applications are gradually expanding.

A transmittance variable device readily transmit and block light coming from the outside, and may be used as a light-shielding film of smart windows for construction, sunroofs for motor vehicles and transparent displays. At this time, it is essential that the transmittance variable device maintains a constant cell gap between both substrates.

As a method for maintaining a cell gap, a ball spacer, a column spacer, and a partition wall such as a mesh or honeycomb pattern may be typically used. However, a ball spacer and a column spacer cause issues of appearance defects occurring when a film is placed vertically over a large area as a liquid phase is shifted to the bottom due to gravity. Accordingly, in the field of transmittance variable device, studies to resolve issues of appearance defects through technologies of patterning a partition wall have been progressed.

Particularly, in the technologies of patterning a partition wall, a pattern that forms a partition wall having a mesh or honeycomb structure in a regular pattern and does not comprises a ball spacer has been developed.

However, the regular pattern produces a light diffraction phenomenon in a specific direction when light transmits, which causes a problem of decreasing visibility of a specific object due to diffused reflection.

Accordingly, studies to increase visibility of a transmittance variable device while maintaining a cell gap have been progressed.

PRIOR ART DOCUMENTS

Patent Documents

European Patent Application Laid-Open Publication No. 0022311

DISCLOSURE

Technical Problem

The present specification relates to a pattern film, a method for manufacturing a pattern film, and a transmittance variable device comprising the same.

Technical Solution

One embodiment of the present application provides a pattern film comprising a base layer; and a spacer pattern formed on the base layer, wherein the spacer pattern comprises a partition wall spacer comprising a plurality of spacer dots and a spacer line connecting the spacer dots, and a ball spacer, the ball spacer is one of being embedded in, partially embedded in or in contact with the partition wall spacer, when any 3 or more spacer dots are selected among the plurality of spacer dots, the spacer line forms a closed figure having the selected spacer dots at the vertices thereof, the selected spacer dots are not present inside the closed figure, a length of at least one side of the closed figure is different from the lengths of the remaining sides, and each spacer dot in the plurality has irregularity of 50% or greater.

Another embodiment provides a method for manufacturing a pattern film, the method comprising forming an ultraviolet curable resin layer comprising a ball spacer on one surface of the base layer; laminating a film mask on the ultraviolet curable resin layer; irradiating the ultraviolet curable resin layer with ultraviolet light through the film mask; peeling the film mask from the ultraviolet curable resin layer after the irradiation; and peeling an uncured area of the ultraviolet curable resin layer after the irradiation.

Lastly, one embodiment of the present application provides a transmittance variable device comprising the pattern film according to the present application; and a substrate disposed opposite to the pattern film, wherein the substrate and the base layer of the pattern film are separated by a space, and wherein the space is maintained by the spacer pattern of the pattern film.

Advantageous Effects

In a pattern film according to one embodiment of the present application, a spacer pattern comprises a partition wall spacer and a ball spacer, and by the spacer dot forming the spacer pattern having irregularity of 50% or greater, the pattern structure is expanded to comprise various patterns from one type of pattern of existing tetragon (mesh) or hexagon (honeycomb) by introducing pattern irregularity while maintaining a cell gap, and by introducing irregularity, a transmittance variable device comprising the same has properties of excellent visibility with reduced diffused reflection since a diffraction phenomenon is improved.

In addition, by using a solvent-free type ultraviolet curable resin layer in manufacturing the pattern film according to the present application, coating and exposure processes may be progressed together in the manufacturing process, which is effective in saving process costs and time, and properties of forming a large area pattern with a uniform height can be obtained.

DESCRIPTION OF DRAWINGS

FIGS. 6A to 6E are diagrams illustrating a method of measuring a diffraction ratio of a pattern film according to one embodiment of the present application.

REFERENCE NUMERAL

Figure 1:
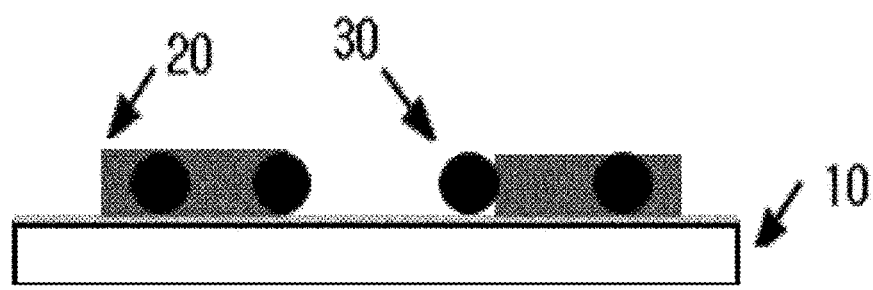
FIG. 1 is a diagram illustrating a side view of a pattern film according to one embodiment of the present application.

10: Base Layer
20: Partition Wall Spacer
30: Ball Spacer

Mode for Disclosure

Hereinafter, the present specification will be described in more detail.

Embodiments of the present disclosure will be described in detail with reference to accompanying drawings so that those skilled in the art readily implement the present disclosure. However, the present disclosure may be embodied to various different forms, and is not limited to the embodiments described herein.

One embodiment of the present application provides a pattern film comprising a base layer; and a spacer pattern formed on the base layer, wherein the spacer pattern comprises a partition wall spacer comprising a plurality of spacer dots and a spacer line connecting the spacer dots, and a ball spacer, the ball spacer is one of being embedded in, partially embedded in or in contact with the at least one partition wall spacer, when any 3 or more spacer dots are selected among the plurality of spacer dots, the spacer line forms a closed figure having the selected spacer dots at the vertices thereof, the selected spacer dots are not present inside the closed figure, a length of at least one side forming the closed figure is different from the lengths of the remaining sides, and each spacer dot in the plurality has irregularity of 50% or greater.

In one embodiment of the present application, the partition wall spacer is formed with a plurality of spacer dots and a spacer line connecting the spacer dots. The spacer dot in the present application is used as a factor for adjusting irregularity, and when the spacer pattern connected by the spacer line is formed, the spacer line and the spacer dot may be expressed as the partition wall spacer.

In the pattern film according to one embodiment of the present application, the spacer pattern comprises a partition wall spacer and a ball spacer, and by the spacer dot having irregularity of 50% or greater, the pattern structure is expanded to comprise various patterns from one type of pattern of existing tetragon (mesh) or hexagon (honeycomb) by introducing pattern irregularity while maintaining a cell gap, and by introducing irregularity, a transmittance variable device comprising the same has properties of excellent visibility with reduced diffused reflection since a diffraction phenomenon is improved.

In one embodiment of the present application, the spacer dot having irregularity of 50% means, in disposing each spacer dot, to have an irregular spacer pattern by randomly moving the spacer dot within a circular area having a radius of 50% (0.5 pitch) of a normal pitch of the selected spacer dot.

In other words, the spacer dot having irregularity of X % may mean that irregularity of X % is satisfied by randomly moving the spacer dot within a circular area having a radius of X % (0.X pitch) of a normal pitch of the selected spacer dot.

Specifically, a method of operating the irregularity is as follows.

The spacer dot having irregularity of 0%, 50% or 70% may be designed in the following manner using a random number coordinate generation program (CAD). First, on a base layer having a total area of approximately 10 mm, 100 dots are disposed regularly (irregularity 0%) in a tetragonal (mesh) or hexagonal arrangement with a space (pitch) of 280 µm and 940 µm.

In the tetragonal arrangement, a spacer pattern disposition having irregularity (50% or 70%) is formed by setting a program so that an individual spacer dot in the square formed by randomly selecting 4 spacer dots randomly moves within a circular area having a radius of 50% (0.5 P) or a radius of 70% (0.7 P) of a normal pitch (P) based on each spacer to move the individual spacer dot. In the hexagonal arrangement, only the formation of regular hexagon formed by selecting 6 spacer dots is different, and the rest of the process is the same as the tetragonal arrangement.

A final spacer pattern is completed by setting a diameter of the individual spacer dot and forming a spacer line connecting the spacer dots. The spacer pattern formed herein may be a pentagonal or a hexagonal pattern as well as a tetragonal pattern, and as the hexagonal arrangement pattern, a tetragonal, a pentagonal or a heptagonal pattern may be formed as well as the hexagon.

Figure 2A:
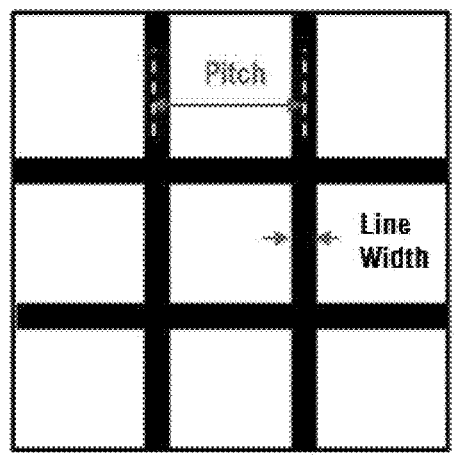
FIG. 2A is a top view illustrating a case where a spacer pattern has a regular pattern.
Figure 2B:
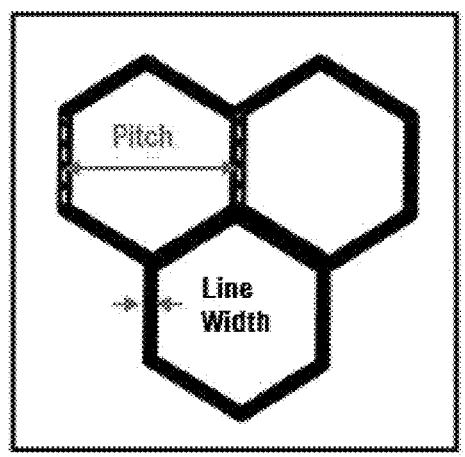
FIG. 2B is a top view illustrating a case where a spacer pattern has a regular pattern.

FIGS. 2A to 2B are top views illustrating a case where the spacer dot has a regular pattern. Specifically, FIGS. 2A and 2B, respectively, are top views when having a mesh pattern and a honeycomb pattern, and a normal pitch and a line width of each of the patterns may be identified.

Figure 3:
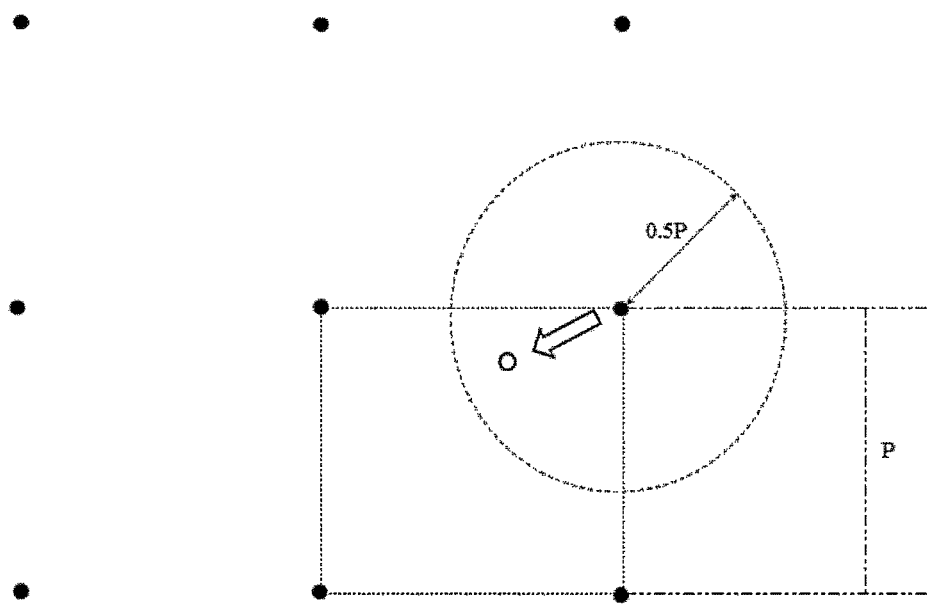
FIG. 3 is a diagram relating to a method of operating 50% irregularity of a tetragonal spacer pattern.

FIG. 3 is a diagram relating to the method of operating 50% irregularity of the tetragonal spacer pattern. In other words, it may be identified that, in the tetragonal arrangement, a spacer disposition pattern having irregularity (50%) is formed by setting a program so that an individual spacer dot in the square formed by randomly selecting 4 spacer dots randomly moves within a circular area having a radius of 50% (0.5 P) of a normal pitch (P) based on each spacer to move the individual spacer dot.

Figure 4:
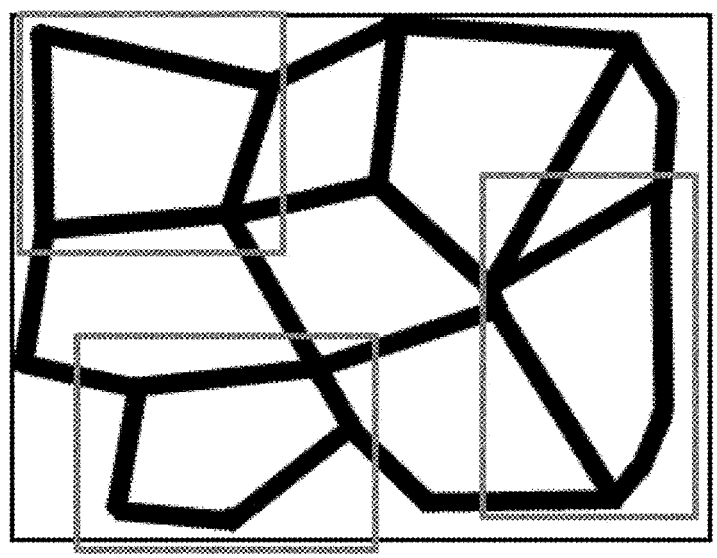
FIG. 4 is a diagram illustrating a pattern after operating 50% irregularity of a tetragonal spacer pattern.

FIG. 4 is a diagram illustrating a pattern after operating 50% irregularity of the tetragonal spacer pattern. Specifically, it is a pattern having 50% irregularity of the tetragonal spacer pattern formed through the operation of FIG. 3, and unlike FIGS. 2A to 2B, it may be identified that the pitch space becomes different.

In one embodiment of the present application, the spacer pattern may have irregularity of 50% or greater, and less than 90%.

In another embodiment, the spacer pattern may have irregularity of 50% or greater and less than 90%, preferably 50% or greater and less than 80%, and more preferably 50% or greater and less than 75%.

In the pattern film according to one embodiment of the present application, the spacer pattern comprises a partition wall spacer and a ball spacer, and by the irregularity of the spacer pattern satisfying the above-mentioned range, the pattern structure is expanded to comprise various patterns from one type of pattern of existing tetragon (mesh) or hexagon (honeycomb), and by introducing irregularity, a transmittance variable device comprising the same has properties of excellent visibility with reduced diffused reflection since a diffraction phenomenon is improved.

FIG. 1 illustrates a side view of the pattern film according to one embodiment of the present application. The pattern film has a spacer pattern on a base layer (10), and it may be identified that the spacer pattern comprises a partition wall spacer (20) and a ball spacer (30), and the ball spacer is included in a form of being embedded in, partially embedded in or in contact with the at least one partition wall spacer.

Particularly, the form of ball spacer inclusion may be specifically identified in FIG. 1, and the ball spacer being embedded in the partition wall spacer means a form of being completely embedded inside, and being partially embedded means a form of the ball spacer being embedded inside the partition wall spacer and a part of the ball spacer being exposed to the outside, and being included in a form of being in contact means one surface of the partition wall spacer being in contact with one surface of the ball spacer.

In one embodiment of the present application, any 3 or more are selected among the plurality of spacer dots, and, when the spacer line is formed so as to form a closed figure surrounded by the selected spacer dots, the spacer dots are not present inside the closed figure, and at least one of the lengths of the sides forming the closed figure may be different.

In one embodiment of the present application, any 3 or more and 10 or less are selected among the plurality of spacer dots, and, when the spacer line is formed so as to form a closed figure surrounded by the selected spacer dots, the spacer dots are not present inside the closed figure, and at least one of the lengths of the sides forming the closed figure may be different.

In one embodiment of the present application, any 3 or more and 6 or less are selected among the plurality of spacer dots, and, when the spacer line is formed so as to form a closed figure surrounded by the selected spacer dots, the spacer dots are not present inside the closed figure, and at least one of the lengths of the sides forming the closed figure may be different.

In one embodiment of the present application, any 3 spacer dots are selected among the plurality of spacer dots, and a closed figure surrounded by these as vertices may be a triangle.

In one embodiment of the present application, any 4 spacer dots are selected among the plurality of spacer dots, and a closed figure surrounded by these as vertices may be a tetragon.

In one embodiment of the present application, any 5 spacer dots are selected among the plurality of spacer dots, and a closed figure surrounded by these as vertices may be a pentagon.

In one embodiment of the present application, any 6 spacer dots are selected among the plurality of spacer dots, and a closed figure surrounded by these as vertices may be a hexagon.

In the pattern film provided in one embodiment of the present application, a maximum length of the lengths of the sides forming the closed figure is 50 µm or greater and 2,500 µm or less.

In the pattern film according to one embodiment of the present application, the spacer pattern has irregularity of greater than 50%, and a ratio of the sides having the same length in the triangle, the tetragon or the hexagon, which is the closed figure, may be less than 85%.

In one example, a ratio (%) of the number of the sides having the same length among the sides of the triangle, the tetragon or the hexagon, which is the closed figure, formed as above (100×(number of the sides having the same length)/3 in the triangle, 100×(number of the sides having the same length)/4 in the tetragon, 100× (number of the sides having the same length)/6 in the hexagon) may be less than 85%. In another example, the ratio may be 84% or less, 80% or less, 76% or less, 67% or less, 55% or less or 40% or less. A lower limit of the ratio is not particularly limited. In other words, a lower limit of the ratio may be 0% since, in some cases, the lengths of all the sides of the closed figure may not be the same.

In other words, by the spacer pattern having irregularity of 50% instead of a regular pattern with an identical space, a transmittance variable device comprising the same has properties of excellent visibility with reduced diffused reflection since a diffraction phenomenon is improved.

In the pattern film provided in one embodiment of the present application, an average value of a height (H) of the partition wall spacer is 2 µm or greater and 100 µm or less, and a standard deviation of the height of the partition wall spacer is 0.05 µm or greater and 0.5 µm or less.

In another embodiment, an average value of the height (H) of the partition wall spacer may be 2 µm or greater and 100 µm or less, preferably 5 µm or greater and 90 µm or less, and more preferably 10 µm or greater and 80 µm or less.

In another embodiment, a standard deviation of the height of the partition wall spacer may be 0.05 µm or greater and 0.5 µm or less, preferably 0.05 µm or greater and 0.4 µm or less, and more preferably 0.05 µm or greater and 0.3 µm or less.

In the pattern film provided in one embodiment of the present application, a line width of the spacer pattern is 10 µm or greater and 200 µm or less.

The line width of the spacer pattern may be, for example, from 10 µm to 200 µm, and, in another example, may be 12 µm or greater, 13 µm or greater, 14 µm or greater, 15 µm or greater, 16 µm or greater, 17 µm or greater, 18 µm or greater, 19 µm or greater, 20 µm or greater, 21 µm or greater, 22 µm or greater, 23 µm or greater, 24 µm or greater, 25 µm or greater or 26 µm or greater, or 200 µm or less, 195 µm or less, 180 µm or less, 170 µm or less, 160 µm or less, 150 µm or less, 149 µm or less, 148 µm or less, 147 µm or less or 146 µm or less.

In the pattern film provided in one embodiment of the present application, a pitch of the spacer pattern may be 50 µm or greater and 1,500 µm or less.

The pitch of the spacer pattern may be, for example, 50 µm or greater and 1,500 µm or less, and, in another example, may be 50 µm or greater, 100 µm or greater, 150 µm or greater, 200 µm or greater, 250 µm or greater or 280 µm or greater, or 1,500 µm or less, 1,400 µm or less or 1,000 µm or less.

The pitch and the line width of the spacer pattern may be properly selected within a range that does not impair purposes of the present application.

In the pattern film provided in one embodiment of the present application, a line width (T) of the partition wall of the partition wall spacer and an average particle diameter (D) of the ball spacer satisfy the following Equation 1.

$$1.0 \leq T/D \leq 20 \quad \text{[Equation 1]}$$

When the pattern film according to one embodiment of the present application satisfies Equation 1, a degree of curing of the lower portion of the partition wall spacer is suitable, which leads to properties of preventing the lower portion of the spacer pattern from being separated from the base layer by a stripper solution, a cleaning solution or a development pressure (1 bar or greater) used in a subsequent process (development process). In other words, when Equation 1 has a value of less than 1.0, a degree of curing of the lower portion of the partition wall spacer is not sufficient, which may cause a problem of losing the partition wall spacer through the lower portion of the spacer pattern being separated from the base layer by a stripper solution, a cleaning solution or a development pressure (1 bar or greater) used in a subsequent process (development process). When Equation 1 is greater than 20, an overcuring phenomenon occurs at an intersection of the partition wall spacer (spacer dot section) resulting in curing in areas other than the partition wall spacer, which may lead to a problem of making the manufacture of the partition wall spacer through selective exposure/development difficult.

In one embodiment of the present application, the line width (T) of the partition wall spacer may be properly adjusted considering transmittance variableness of a transmittance variable device comprising the same afterward.

Specifically, the line width (T) of the partition wall of the partition wall spacer may be from 10 µm to 200 µm, and, in another example, may be 20 µm or greater, 30 µm or greater, 40 µm or greater, 50 µm or greater, 60 µm or greater, 70 µm or greater or 80 µm or greater, or 190 µm or less, 180 µm or less, 170 µm or less, 160 µm or less, 150 µm or less, 140 µm or less, 130 µm or less, 120 µm or less, 110 µm or less, 100 µm or less or 90 µm or less.

The average particle diameter (D) of the ball spacer of the present application may be adjusted considering a space between an upper substrate and a lower substrate of a transmittance variable device comprising the same afterward. For example, the average particle diameter (D) of the ball spacer may be from 1 µm to 15 µm, and, in another example, may be 2 µm or greater, 3 µm or greater, 4 µm or greater, 5 µm or greater, 6 µm or greater, 7 µm or greater or 8 µm or greater, or 15 µm or less, 14 µm or less, 13 µm or less, 12 µm or less, 11 µm or less, 10 µm or less or 9 µm or less.

In the pattern film provided in one embodiment of the present application, a standard deviation of the particle diameter of the ball spacer is 0.8 µm or less.

In another embodiment, the standard deviation of the particle diameter of the ball spacer may be 0.8 µm or less, preferably 0.7 µm or less, and more preferably 0.5 µm or less, and may be 0.05 µm or greater.

In the pattern film provided in one embodiment of the present application, optical density of the spacer pattern is 0.4 or greater and 4 or less.

The optical density may be obtained by measuring transmittance (unit: %) of the spacer pattern and then substituting the transmittance into an equation of optical density (optical density=−log 10 (T), T is the transmittance).

In another embodiment, the optical density of the spacer pattern may satisfy 0.4 or greater and 4.0 or less, preferably 0.5 or greater and 3.5 or less, and more preferably 1.0 or greater and 3.0 or less.

In the transmittance variable device capable of adjusting light transmittance, color or reflectivity, the area where the spacer pattern is present becomes an optically inactive area, and by the pattern film according to the present application satisfying the optical density range, light leakage may be controlled, and uniform optical performance may be secured when used in a transmittance variable device afterward by obtaining preparation stability of the spacer pattern. In other words, the optical density being less than the above-mentioned range may cause a problem of light leakage by passing through inside the spacer pattern, an optically inactive area, when driving the device, and the optical density being greater than the above-mentioned range may cause a problem of causing pattern preparation defects since UV curing of the polymer resin is inhibited by an increased content of black particles (carbon black or the like) achieving low transmittance (0.01%).

In one embodiment of the present application, as the base layer, any base layer used in a substrate in a constitution of a known optical device such as a liquid crystal display (LCD) may be used. For example, the base layer may be an inorganic base layer or an organic base layer. Examples of the inorganic base layer may comprise a glass base layer and the like, and examples of the organic base layer may comprise various plastic films and the like. Examples of the plastic film may comprise a TAC (triacetyl cellulose) film; a COP (cyclo olefin copolymer) film such as a norbornene derivative; an acrylic film such as PMMA (poly(methyl methacrylate); a PC (polycarbonate) film; a polyolefin film such as PE (polyethylene) or PP (polypropylene); a PVA (polyvinyl alcohol) film; a DAC (diacetyl cellulose) film; a Pac (polyacrylate) film; a PES (polyether sulfone) film; a PEEK (polyetheretherketon) film; a PPS (polyphenylsulfone) film; a PEI (polyetherimide) film; a PEN (polyethylene naphthalate) film; a PET (polyethylene terephthalate) film; a PI (polyimide) film; a PSF (polysulfone) film; a PAR (polyarylate) film or the like, but are not limited thereto.

In one example, the base layer may be a so-called flexible base layer. Specific types of the flexible base layer are not particularly limited, and among the base layers described above, mostly plastic films, or very thin inorganic bases such as thin glass may also be used as the flexible base layer.

A thickness of the base layer is not particularly limited, and proper ranges may be selected depending on the application. Specifically, the thickness may satisfy a range of 1 µm or greater and 1,000 µm or less, preferably 10 µm or greater and 900 µm or less, and more preferably 30 µm or greater and 500 µm or less.

In one embodiment of the present application, another element required for driving a transmittance variable device may be further included between the base layer and the spacer pattern. Various such elements are known, and typically, an electrode layer and the like are included.

In other words, in one embodiment of the present application, the pattern film may further comprise an electrode layer between the base layer and the spacer pattern.

As the electrode layer, known materials may be used. For example, the electrode layer may comprise a metal alloy, an electrically conductive compound, or a mixture of two more types thereof. Examples thereof may comprise a metal such as gold, CuI, oxide materials such as ITO (indium tin oxide), IZO (indium zinc oxide), ZTO (zinc tin oxide), aluminum or indium doped zinc oxide, magnesium indium oxide, nickel tungsten oxide, ZnO, $SnO_2$ or $In_2O_3$, metal nitrides such as gallium nitride, metal selenides such as zinc selenide, metal sulfides such as zinc sulfide, and the like. A transparent hole injecting electrode layer may also be formed using a laminate of a metal thin film such as Au, Ag or Cu and a high refractive transparent material such as ZnS, $TiO_2$ or ITO, and the like.

The electrode layer may be formed using any means such as vapor deposition, sputtering, chemical vapor deposition or electrochemical means. The electrode layer may be patterned using known methods without particular limit, and for example, may be patterned through a known process using a photolithography, a shadow mask or the like.

In the pattern film provided in one embodiment of the present application, a total area (A) of the base layer and an area (B) of the surface of the base layer in contact with the spacer pattern satisfy the following Equation 2.

$$5 \leq [B/A] \times 100(\%) \leq 30 \qquad \text{[Equation 2]}$$

When the pattern film according to one embodiment of the present application satisfies Equation 2, a degree of curing of the lower portion of the partition wall spacer is suitable, which leads to properties of preventing the lower portion of the spacer pattern from being separated from the base layer by a stripper solution, a cleaning solution or a development pressure (1 bar or greater) used in a subsequent process (development process). In other words, when Equation 2 has a value of less than 5%, the partition wall spacer does not have sufficient time to cure, which decreases a degree of curing of the lower portion causing a problem of losing the partition wall spacer through the lower portion of the spacer pattern being separated from the base layer by a stripper solution, a cleaning solution or a development pressure (1 bar or greater) used in a subsequent process (development process). When equation 2 is greater than 30%, an overcuring phenomenon occurs at an intersection (spacer dot section) of the partition wall spacer resulting in curing in areas other than the partition wall spacer, which may cause a problem of making the manufacture of the partition wall spacer through selective exposure/development difficult.

In the pattern film provided in one embodiment of the present application, a rectangular 200×200 pixel area is set based on an area of the pattern film through which light passes from an LED light source, and based on using a lower left end corner of the rectangular 200×200 pixel area as x axis, y axis (0,0), the rectangular 200×200 pixel area of (0,0) to (200,200) satisfies the following Equation 3.

$$2 \leq D1-D2(\%) \leq 10 \qquad \text{[Equation 3]}$$

In Equation 3,

D1 is a diffraction ratio when the spacer dot of the pattern film has irregularity of 0%, D2 is a diffraction ratio when the spacer dot of the pattern film has irregularity of 70%, and each diffraction ratio satisfies the following Equation 4, $$[1-Sc/S] \times 100(\%) \qquad \text{[Equation 4]}$$

in Equation 4,

S is a total amount of light in the rectangular 200×200 pixel area of (0,0) to (200,200), and Sc is an amount of pixel light in an area having pixels employing (100,100) as an origin and having a radius of 50 in the rectangular 200×200 pixel area of (0,0) to (200,200).

In the present application, setting a rectangular 200×200 pixel area based on an area through which light passes when passing light to the pattern film from an LED light source of the pattern film is selecting an arbitrary pixel area, and may be a method for evaluating a degree of diffraction of the pattern film. In the present application, the pixel area is not limited, and may be set as an X1×Y1 pixel area when generalized. X1 may be an integer of 100 to 10,000, and Y1 may be an integer of 100 to 10,000.

Herein, S means a total amount of light in the rectangular X1×Y1 pixel area of (0,0) to (X1,Y1), and Sc means an amount of pixel light in an area having pixels employing (X1/2,Y1/2) as an origin and having a radius of (x1/2)*1/2 in the rectangular X1, Y1 pixel area of (0,0) to (X1,Y1).

In other words, Equation 3 and Equation 4 are data showing that the pattern film according to the present application has an improved degree of diffraction, and the present application is not limited to the pixel area described above.

In one embodiment of the present application, the method of measuring light by passing through light from an LED light source may use various methods known in the art, and specifically, a device of 3 mm LED, 5 mm hole, lens (Model: FLCC-1614-2M, manufacturer: Konica Minolta) and CCD (Model: CA-2500, manufacturer: Konica Minolta) may be formed to conduct the measurement.

In one embodiment of the present application, the method of measuring the diffraction ratio may be as follows.

1. The pattern film to measure is fixed at a distance of 0.1 cm from a lens.
2. Light of an LED light source is turned on, and diffraction occurring the moment when light passes through a 5 mm hole and passes through the pattern film to measure is saved in red to blue colors through the lens and a CCD, and a qualitative difference in the diffraction is calculated from the saved images.

Figure 5:
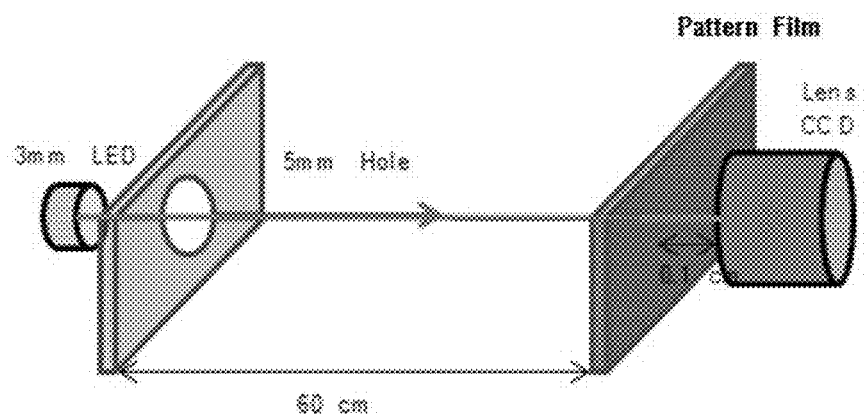
FIG. 5 is a diagram schematically illustrating a device measuring a diffraction ratio of a pattern film according to one embodiment of the present application.

FIG. 5 is a diagram schematically illustrating a device measuring the diffraction ratio of the pattern film according to one embodiment of the present application.

In one embodiment of the present application, passing light from an LED light source of the pattern film may pass light through the device described above, and after passing light to the pattern film of the present application from the device, the rectangular 200×200 pixel area (frame) of (0,0) to (200,200) based on a lower left end corner as x axis, y axis (0,0) is formed from the original image obtained from the measurement device.

In other words, the area through which light passes may be divided into individual pixels of 200×200, and the amount of light of each pixel such as (0,0), (0,1) and (0,2) may be calculated. The calculation method may be as follows.

In order to remove a noise caused by the border of the edge, an image file obtained after removing the border of the edge (remove the frame area) is saved in a jpg format. Herein, a method of removing the border of the edge is to use a drawing tool/cut command of the MS-office, use other image processing specialized programs such as Image J and photoshop, or conduct coding using programs such as MAT-LAB and Python.

The total sum of red of each pixel may be calculated using any program providing an individual pixel value and statistics of an RGB stack by retrieving an image file such as an image processing specialized programs such as Image J, or a coding program such as MATLAB and Python, and the image is changed to black/white to provide a method that many programs automatically calculate.

In one embodiment of the present application, the diffraction ratio of the pattern film may satisfy the following Equation 4.

$$[1-Sc/S] \times 100(\%) \qquad \text{[Equation 4]}$$

S is a total amount of light in the rectangular 200×200 pixel area of (0,0) to (200,200), and Sc is an amount of pixel light in an area having pixels employing (100,100) as an origin and having a radius of 50 in the rectangular 200×200 pixel area of (0,0) to (200,200).

In other words, the light amount of each pixel of 200×200 may be calculated as above through an image processing program, and S means a total amount of light in a pixel area of 200×200 and Sc means an amount of light in an area having pixels employing (100,100) as an origin and having a radius of 50, and it may mean that more diffraction occurs as the value of Equation 4 increases.

In one embodiment of the present application, the pattern film may satisfy the following Equation 3.

$$2 \leq D1-D2(\%) \leq 10 \qquad \text{[Equation 3]}$$

In Equation 3,

D1 is a diffraction ratio when the spacer dot of the pattern film has irregularity of 0%, and D2 is a diffraction ratio when the spacer dot of the pattern film has irregularity of 70%.

In one embodiment of the present application, Equation 3 may satisfy a range of $2 \leq D1-D2(\%) \leq 10$, preferably $2 \leq D1-D2(\%) \leq 9$, and more preferably $2 \leq D1-D2(\%) \leq 8$.

By adjusting the spacer dot to have irregularity of greater than 50% in the pattern film according to one embodiment of the present application, the pattern structure is expanded to comprise various patterns from one type of pattern of existing tetragon (mesh) or hexagon (honeycomb) by introducing pattern irregularity while maintaining a cell gap, and by introducing irregularity, a transmittance variable device comprising the same has properties of excellent visibility with reduced diffused reflection since a diffraction phenomenon is improved, and satisfying the range of Equation 3 may be identified.

FIGS. 6A to 6D are diagrams illustrating a method of measuring the diffraction ratio of the pattern film according to one embodiment of the present application. Specifically, after passing light to the pattern film according to the present application through the LED light source, the pattern image is retrieved from the measurement device using an Image J program, and the original copy (FIG. 6A) is saved. After that, in order to remove a noise caused by the border of the edge, the rectangular 200×200 pixel area (frame) of (0,0) to (200,200) based on a lower left end corner as x axis, y axis (0,0) is formed in the original image (FIG. 6A), the area outside the frame is removed (FIG. 6B). After separating the result into type/RGB stack in the image menu, only the red stack is saved, and converted to black/white (FIG. 6C). Herein, the minimum value of the pixel value is 0 (black area) and the maximum value is 255 (white area), and after selecting the area having pixels employing (100,100) as an origin and having a radius of 50 (FIG. 6D), the pixel value in each area is calculated to measure the diffraction ratio (FIG. 6E).

In other words, in FIG. 6D, the lower left end (0,0) of the rectangle (shown in FIG. 6A) becomes a base after removing the edge from of the pattern film, and with the right side having +x and the upper portion having +y, the area having pixels employing (100,100) as an origin and having a radius of (200/2)*1/2=50 based on +x may be expressed as a circular area of the center portion.

One embodiment of the present application provides a method for manufacturing a pattern film, the method comprising preparing a base layer; forming an ultraviolet curable resin layer comprising a ball spacer on one surface of the base layer; imprinting a film mask on the ultraviolet curable resin layer; irradiating ultraviolet light from the film mask side; peeling the film mask from the ultraviolet curable resin layer; and peeling an uncured area of the ultraviolet curable resin layer.

FIGS. 7A to 7D are diagrams schematically illustrating the process for manufacturing a pattern film according to one embodiment of the present application.

Figure 7A:
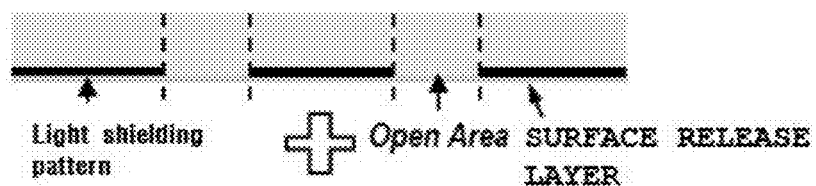
FIGS. 7A to 7D are diagrams schematically illustrating a process for manufacturing a pattern film according to one embodiment of the present application.
Figure 7B:
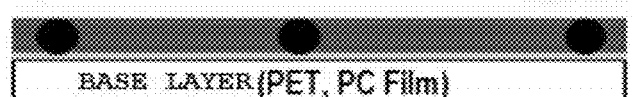
Figure 7C:
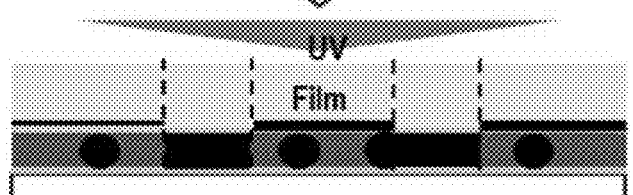
Figure 7D:

In the method for manufacturing a pattern film provided in one embodiment of the present application, the film mask comprises a transparent base; a light shielding pattern formed on one surface of the transparent base; and a surface release layer formed on the light shielding pattern-formed surface of the transparent base as shown in FIG. 7A. The method includes forming an ultraviolet curable resin layer comprising a ball spacer on one surface of a base layer as shown in FIG. 7B, laminating the film mask on the ultraviolet curable resin layer and irradiating the ultraviolet curable resin layer with ultraviolet light through the film mask as shown in FIG. 7C, and peeling the film mask from the ultraviolet curable resin layer after the irradiation, and peeling an uncured area of the ultraviolet curable resin layer after the irradiation as shown in FIG. 7D.

One embodiment of the present application provides a transmittance variable device comprising the pattern film according to the present application; and a substrate disposed opposite to the pattern film and maintaining a space with the pattern film by a spacer pattern of the pattern film.

Such a transmittance variable device may be used in various applications. Examples of the applications in which the transmittance variable device may be used comprise openings in closed space comprising buildings, containers or vehicles such as windows or sunroofs, eyewear or the like, windows and doors, light shielding plates of organic light emitting devices (OLED), and the like. The scope of the eyewear may comprise all eyewear formed for an observer to observe the outside through a lens such as general glasses, sunglasses, sport goggles, or wearable devices such as helmets or devices for experiencing virtual reality or augmented reality.

Typical applications in which the transmittance variable device of the present application may be used may comprise a sunroof for vehicles.

In one example, the transmittance variable device itself may be a sunroof for a vehicle. For example, in a motor vehicle comprising a vehicle body in which at least one or more openings are formed, the transmittance variable device mounted on the opening or a sunroof for a vehicle may be mounted and used.

A sunroof is a fixed or moving (venting or sliding) opening present on a ceiling of a vehicle, and may collectively refer to a device capable of functioning to allow light or fresh air to flow into the vehicle. The operating method of the sunroof is not particularly limited in the present application, and, for example, may be manually operated or driven by a motor, and a shape, size or style of the sunroof may be properly selected depending on the targeted use. For example, examples of the sunroof may comprise, depending on the method of operation, a pop-up type sunroof, a spoiler (tile & slide) type sunroof, an in-built type sunroof, a folding type sunroof, a top-mount type sunroof, a panoramic roof system type sunroof, a removable roof panel (t-top or targa roof) type sunroof, a solar type sunroof or the like, but are not limited thereto.

The sunroof illustrated in the present application may comprise the transmittance variable device of the present application, and in this case, specific details on the transmittance variable device may be the same as the descriptions provided in the section of the transmittance variable device.

In the transmittance variable device provided in one embodiment of the present application, an adhesive layer having vertical alignment force is included between the pattern film and the substrate.

Hereinafter, the present specification will be described in more detail with reference to examples. However, the following examples are for illustrative purposes only, and not to limit the present specification.

Preparation Example

Example 1

A curable composition used for forming a partition wall spacer was prepared in the following manner.

A black ball spacer and a darkening material were mixed to a binder commonly used in partition wall spacer preparation as a binder comprising a UV curable acrylate compound, a polymerization initiator and a dispersant to prepare a curable composition. Herein, as the black ball spacer, a black ball spacer (manufacturer: Sekisui Chemical, product name: KBN 510) having an average particle diameter of approximately 10 µm, a CV (coefficient of variation) of 4, and a standard deviation of the particle diameter of approximately 0.4 µm was used. The black ball spacer was mixed in 2.5 parts by weight with respect to 100 parts by weight of the binder. In addition, as the darkening material, carbon black was mixed in a ratio of approximately 3% by weight in the material. The prepared composition was identified to have optical density (OD) of approximately 1.7.

To a monoaxially elongated base film (PET, poly(ethylene terephthalate)) having a non-crystalline ITO (indium tin oxide) electrode layer formed on the surface, 2 mL to 3 mL of the curable composition prepared above was dropped on the electrode layer, and the dropped mixture was compressed using a mask to form a laminate comprising the base layer, the electrode layer, the curable composition layer and the mask, and ultraviolet light was irradiated toward the mask to cure the curable composition layer. (Irradiation dosage: 380 mJ/cm$^2$)

As the mask used, a mask having a shape in which a patterned light shielding layer (AgX, X=Cl, F, Br or I) and a release layer are consecutively formed on a PET film, a transparent base film, was used as illustrated in FIG. 7C. Herein, the light shielding layer pattern has irregularity of approximately 70%, and designed in the following manner using a random number coordinate generation program (CAD).

First, a state of disposing 100 dots on a base layer having a total area of approximately 10 mm each with a constant space (normal pitch) of 280 µm as in FIG. 3 was assumed (state of normal disposition). Herein, a cross-sectional area of the bottom of the individual dot was adjusted to approximately 12 µm. After that, a disposition pattern was formed by setting a program so that individual dots in the square formed by selecting 4 dots randomly move within a circular area having a radius of 70% (0.7 P) of the normal pitch based on each dot to move the individual dots. After that, the individual dots were connected by a line.

FIG. 4 illustrates an example of the disposition of the partition wall spacer designed as above, and it may be seen that a pentagon and a hexagon are obtained as well as a tetragon. Among the lengths of all the sides of the closed figure, the minimum length was approximately 55 µm, and the maximum length was approximately 470 µm.

After irradiating ultraviolet light, the uncured curable composition was removed (developed) to form a partition wall spacer. FIG. 1 is a cross-sectional image of the spacer pattern-formed pattern film manufactured as above. As in FIG. 1, the partition wall spacer forms a spacer pattern in a form of the black ball spacer being embedded, partially embedded or in contact. The prepared partition wall spacer had a height of approximately 9.9 µm to 10.2 µm with an average of approximately 10.1 µm, and the line width was measured to be approximately 27 µm to 31 µm with an average of approximately 28.5 µm.

In addition, the ratio of the area having the spacer pattern present on the pattern film surface was approximately 19% to 20%. Herein, a standard deviation of the height of the spacer pattern was approximately 0.15 µm, and a standard deviation of the diameter of the ball spacer was approximately 0.70 µm. A ratio (T/D) of the line width (T) of the partition wall of the partition wall spacer and the average particle diameter (D) of the ball spacer was measured to be 2.85.

Figure 8A:
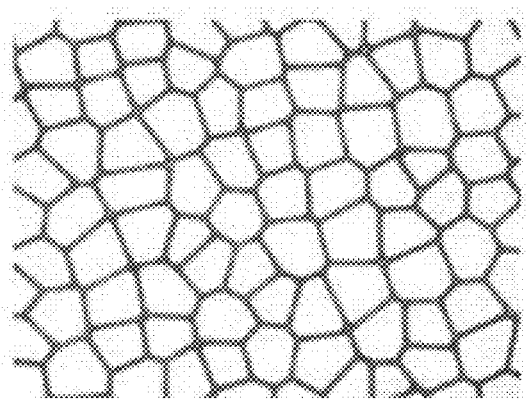
FIGS. 8A to 8C are diagrams showing an optical microscope image of 50 magnifications and an optical microscope image of 200 magnifications for a pattern film according to Example 1 of the present application, and a result of diffraction evaluation thereon.
Figure 8B:
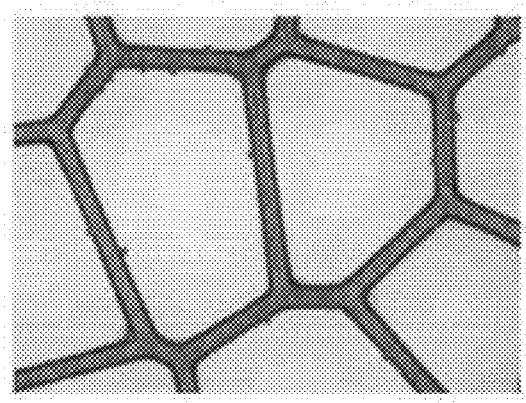
Figure 8C:
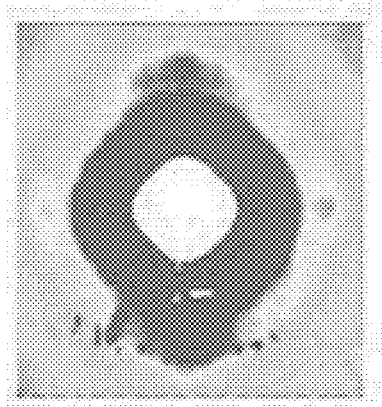

No diffraction line was qualitatively observed as a result of the diffraction evaluation, and the diffraction ratio measured by Equation 4 had a quantitative value of 27.2%. FIGS. 8A to 8C are diagrams showing an optical microscope image of 50 magnifications (FIG. 8A and an optical microscope image of 200 magnifications (FIG. 8B) for the pattern film according to Example 1 of the present application, and the result of diffraction evaluation (FIG. 8C) thereon. Specifically, comprising a rectangular-shaped spacer pattern comprising the ball spacer and the partition wall spacer and having irregularity of 70% was identified from the results of the optical microscope images, and no diffraction line was observed.

Example 2

A pattern film was formed in the same manner as in Example 1 except that the mask design (design in which the light shielding layer pattern randomly moves within a circular area having a radius of 50% [0.5 P] of the normal pitch) was changed.

The prepared partition wall spacer had a height of approximately 9.9 µm to 10.2 µm with an average of approximately 10.1 µm, and the line width was measured to be approximately 28 µm to 32 µm with an average of approximately 29.3 µm.

In addition, the ratio of the area having the spacer pattern present on the pattern film surface was approximately 19% to 20%. Herein, a standard deviation of the height of the spacer pattern was approximately 0.17 µm, and a standard deviation of the diameter of the ball spacer was approximately 0.75 µm. A ratio (T/D) of the line width (T) of the partition wall of the partition wall spacer and the average particle diameter (D) of the ball spacer was measured to be 2.93.

Figure 9A:
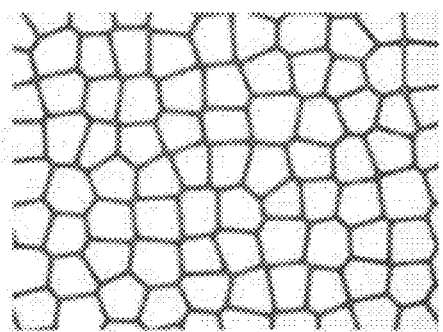
FIGS. 9A to 9C are diagrams showing an optical microscope image of 50 magnifications and an optical microscope image of 200 magnifications for a pattern film according to Example 2 of the present application, and a result of diffraction evaluation thereon.
Figure 9B:
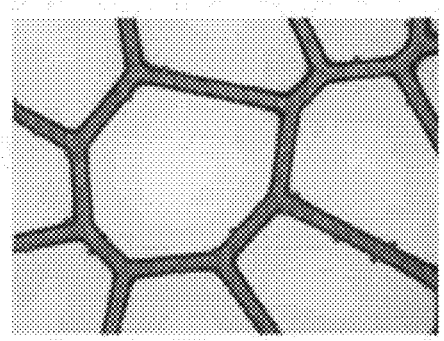
Figure 9C:
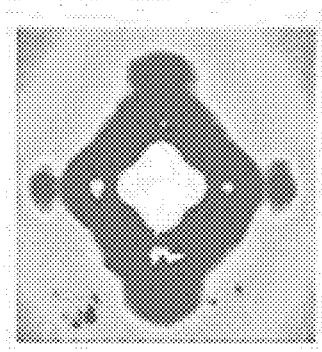

No diffraction line was qualitatively observed as a result of the diffraction evaluation, and the diffraction ratio measured by Equation 4 had a quantitative value of 29.3%. FIGS. 9A to 9C are diagrams showing an optical microscope image of 50 magnifications (FIG. 9A) and an optical microscope image of 200 magnifications (FIG. 9B) for the pattern film according to Example 2 of the present application, and the result of diffraction evaluation (FIG. 9C) thereon. Specifically, comprising a rectangular-shaped spacer pattern comprising the ball spacer and the partition wall spacer and having irregularity of 50% was identified from the results of the optical microscope images, and no diffraction line was observed.

Comparative Example 1

A pattern film was formed in the same manner as in Example 1 except that the mask design (design in which the light shielding layer pattern is a regular pattern) was changed.

The prepared partition wall spacer had a height of approximately 9.9 µm to 10.1 µm with an average of approximately 10.0 µm, and the line width was measured to be approximately 27 µm to 31 µm with an average of approximately 28.7 µm.

In addition, the ratio of the area having the spacer pattern present on the pattern film surface was approximately 19% to 20%. Herein, a standard deviation of the height of the spacer pattern was approximately 0.16 µm, and a standard deviation of the diameter of the ball spacer was approximately 0.73 µm. A ratio (T/D) of the line width (T) of the partition wall of the partition wall spacer and the average particle diameter (D) of the ball spacer was measured to be 2.87.

Figure 10A:
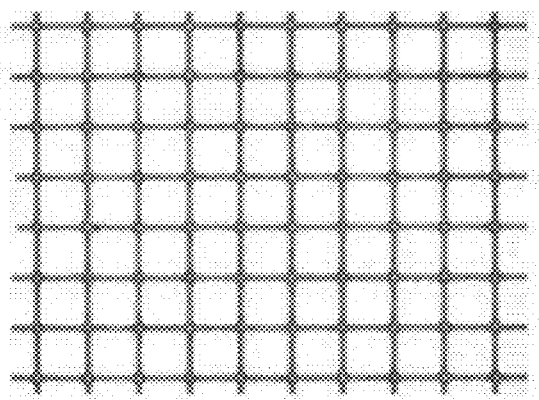
FIGS. 10A to 10C are diagrams showing an optical microscope image of 50 magnifications and an optical microscope image of 200 magnifications for a pattern film according to Comparative Example 1 of the present application, and a result of diffraction evaluation thereon.
Figure 10B:
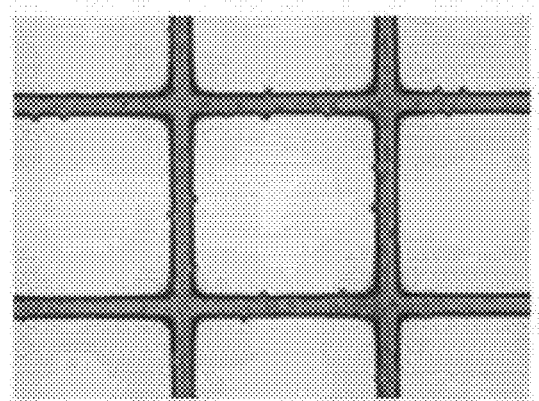
Figure 10C:
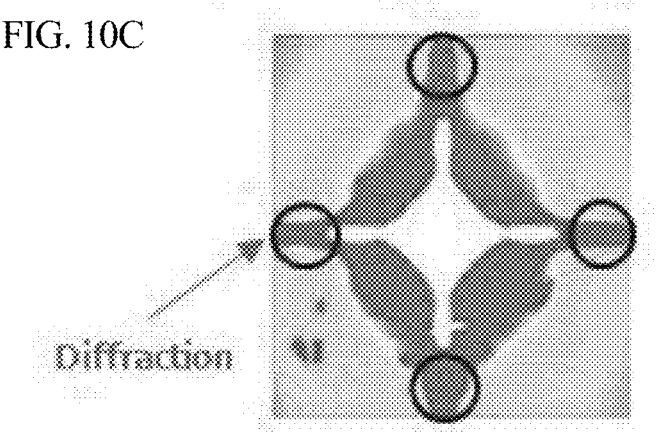

A diffraction line was clearly observed qualitatively as a result of the diffraction evaluation, and the diffraction ratio measured by Equation 4 had a quantitative value of 29.9%. FIGS. 10A to 10C are diagrams showing an optical microscope image of 50 magnifications (FIG. 10A) and an optical microscope image of 200 magnifications (FIG. 10B) for the pattern film according to Comparative Example 1 of the present application, and the result of diffraction evaluation (FIG. 10C) thereon. Specifically, comprising a spacer pattern comprising the ball spacer and the partition wall spacer and having a regular pattern (tetragon) was identified from the results of the optical microscope images, and a diffraction line was clearly observed.

Example 3

A pattern film was formed in the same manner as in Example 1 except that the mask design (design in which the light shielding layer pattern has a space [pitch] of 940 µm) was changed.

The prepared partition wall spacer had a height of approximately 9.9 µm to 10.2 µm with an average of approximately 10.1 µm, and the line width was measured to be approximately 95 µm to 100 µm with an average of approximately 97.8 µm.

In addition, the ratio of the area having the spacer pattern present on the pattern film surface was approximately 19% to 20%. Herein, a standard deviation of the height of the spacer pattern was approximately 0.15 µm, and a standard deviation of the diameter of the ball spacer was approximately 0.90 µm. A ratio (T/D) of the line width (T) of the partition wall of the partition wall spacer and the average particle diameter (D) of the ball spacer was measured to be 9.78.

Figure 11A:
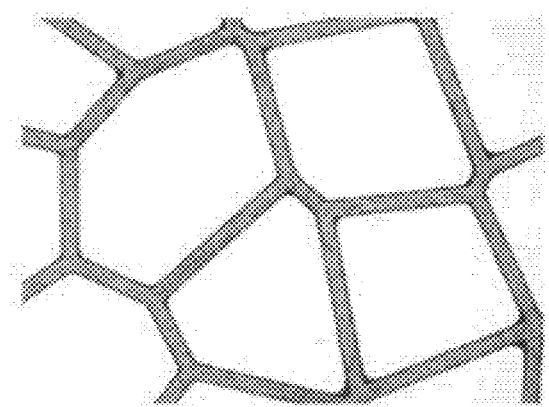
FIGS. 11A to 11C are diagrams showing an optical microscope image of 50 magnifications and an optical microscope image of 200 magnifications for pattern films according to Example 3 of the present application, and a result of diffraction evaluation thereon.
Figure 11B:
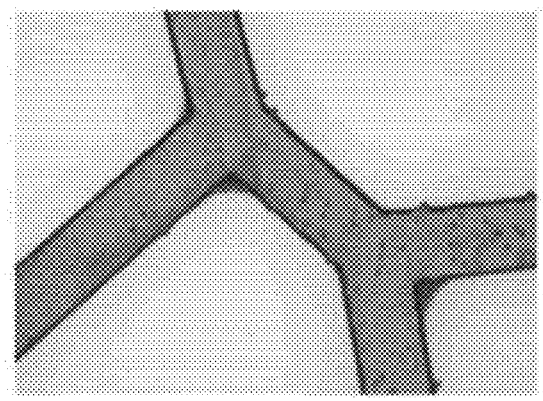
Figure 11C:
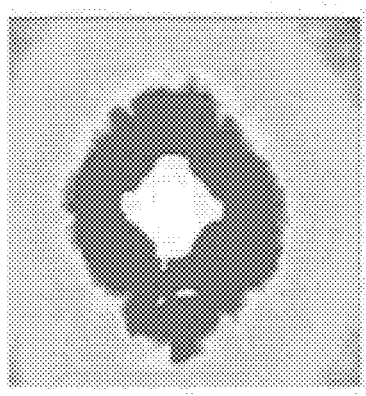

No diffraction line was qualitatively observed as a result of the diffraction evaluation, and the diffraction ratio measured by Equation 4 had a quantitative value of 20.5%. FIGS. 11A to 11C are diagrams showing an optical microscope image of 50 magnifications (FIG. 11A) and an optical microscope image of 200 magnifications (FIG. 11B) for the pattern film according to Example 3 of the present application, and the result of diffraction evaluation (FIG. 11C) thereon. Specifically, comprising a rectangular-shaped spacer pattern comprising the ball spacer and the partition wall spacer and having irregularity of 70% was identified from the results of the optical microscope images, and no diffraction line was observed.

Example 4

A pattern film was formed in the same manner as in Example 1 except that the mask design (design in which the light shielding layer pattern has a space [pitch] of 940 µm and the light shielding layer pattern randomly moves within a circular area having a radius of 50% [0.5 P] of the normal pitch) was changed.

The prepared partition wall spacer had a height of approximately 9.9 μm to 10.1 μm with an average of approximately 10.0 μm, and the line width was measured to be approximately 96 μm to 99 μm with an average of approximately 97.5 μm.

In addition, the ratio of the area having the spacer pattern present on the pattern film surface was approximately 19% to 21%. Herein, a standard deviation of the height of the spacer pattern was approximately 0.15 μm, and a standard deviation of the diameter of the ball spacer was approximately 0.88 μm. A ratio (T/D) of the line width (T) of the partition wall of the partition wall spacer and the average particle diameter (D) of the ball spacer was measured to be 9.75.

Figure 12A:
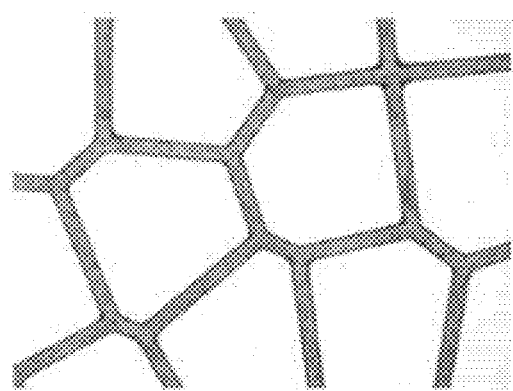
FIGS. 12A to 12C are diagrams showing an optical microscope image of 50 magnifications and an optical microscope image of 200 magnifications for pattern films according to Example 4 of the present application, and a result of diffraction evaluation thereon.
Figure 12B:
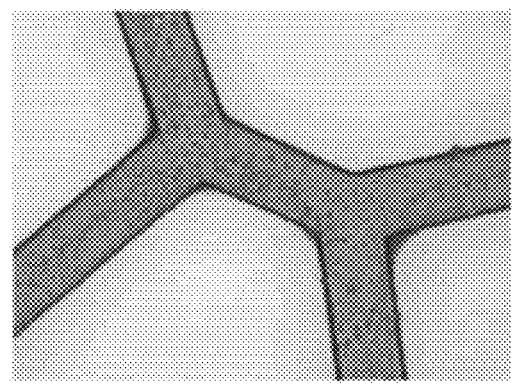
Figure 12C:
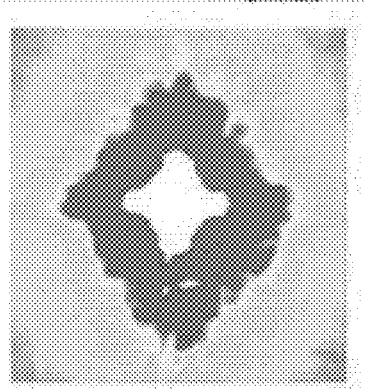

No diffraction line was qualitatively observed as a result of the diffraction evaluation, and the diffraction ratio measured by Equation 4 had a quantitative value of 23.9%. FIGS. 12A to 12C are diagrams showing an optical microscope image of 50 magnifications (FIG. 12A) and an optical microscope image of 200 magnifications (FIG. 12B) for the pattern film according to Example 4 of the present application, and the result of diffraction evaluation (FIG. 12C) thereon. Specifically, comprising a rectangular-shaped spacer pattern comprising the ball spacer and the partition wall spacer and having irregularity of 50% was identified from the results of the optical microscope images, and no diffraction line was observed.

Comparative Example 2

A pattern film was formed in the same manner as in Example 1 except that the mask design (design in which the light shielding layer pattern has a space [pitch] of 940 μm and the light shielding layer pattern is a regular pattern) was changed.

The prepared partition wall spacer had a height of approximately 9.9 μm to 10.1 μm with an average of approximately 10.0 μm, and the line width was measured to be approximately 94 μm to 97 μm with an average of approximately 95.6 μm.

In addition, the ratio of the area having the spacer pattern present on the pattern film surface was approximately 19% to 20%. Herein, a standard deviation of the height of the spacer pattern was approximately 0.16 μm, and a standard deviation of the diameter of the ball spacer was approximately 0.79 μm. A ratio (T/D) of the line width (T) of the partition wall of the partition wall spacer and the average particle diameter (D) of the ball spacer was measured to be 9.56.

Figure 13A:
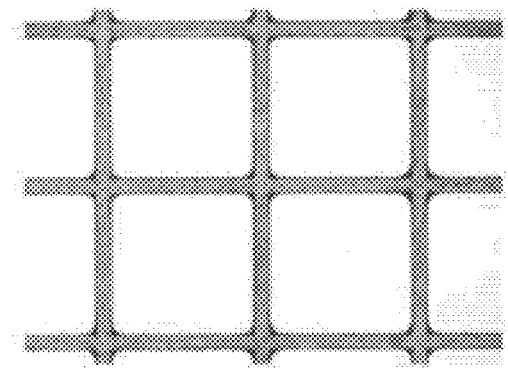
FIGS. 13A to 13C are diagrams showing an optical microscope image of 50 magnifications and an optical microscope image of 200 magnifications for pattern films according to Comparative Example 2 of the present application, and a result of diffraction evaluation thereon.
Figure 13B:
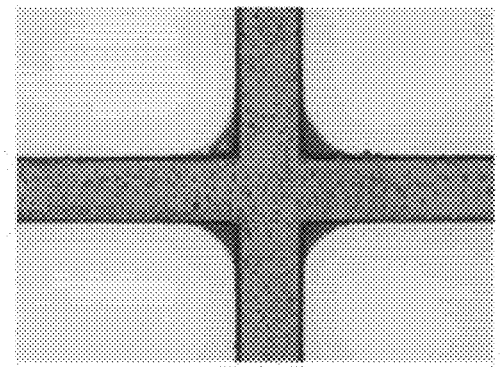
Figure 13C:
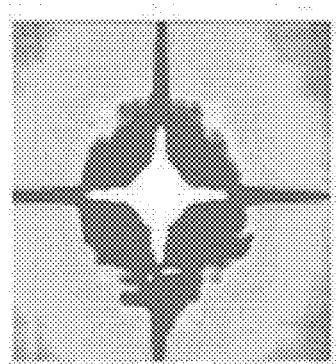

A diffraction line was clearly observed qualitatively as a result of the diffraction evaluation, and the diffraction ratio measured by Equation 4 had a quantitative value of 26.6%. FIGS. 13A to 13C are diagrams showing an optical microscope image of 50 magnifications (FIG. 13A) and an optical microscope image of 200 magnifications (FIG. 13B) for the pattern film according to Comparative Example 2 of the present application, and the result of diffraction evaluation (FIG. 13C) thereon. Specifically, comprising a spacer pattern comprising the ball spacer and the partition wall spacer and having a regular pattern (tetragon) was identified from the results of the optical microscope images, and a diffraction line was clearly observed.

Example 5

A pattern film was formed in the same manner as in Example 1 except that the mask design (design in which, as the light shielding layer pattern, a program is set so that individual dots in a hexagon formed by selecting 6 spacer dots randomly move within a circular area having a radius of 70% (0.7 P) of the normal pitch based on each dot) was changed.

The prepared partition wall spacer had a height of approximately 9.9 μm to 10.2 μm with an average of approximately 10.1 μm, and the line width was measured to be approximately 27 μm to 31 μm with an average of approximately 28.9 μm.

In addition, the ratio of the area having the spacer pattern present on the pattern film surface was approximately 19% to 20%. Herein, a standard deviation of the height of the spacer pattern was approximately 0.15 μm, and a standard deviation of the diameter of the ball spacer was approximately 0.75 μm. A ratio (T/D) of the line width (T) of the partition wall of the partition wall spacer and the average particle diameter (D) of the ball spacer was measured to be 2.89.

Figure 14A:
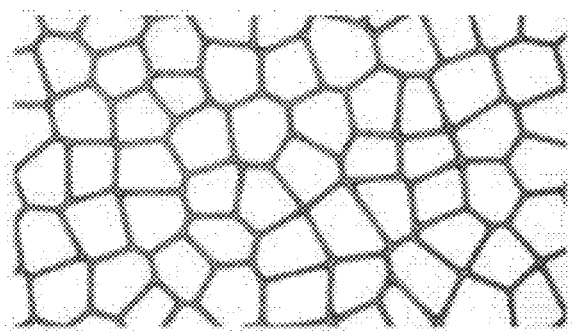
FIGS. 14A to 14C are diagrams showing an optical microscope image of 50 magnifications and an optical microscope image of 200 magnifications for pattern films according to Example 5 of the present application, and a result of diffraction evaluation thereon.
Figure 14B:
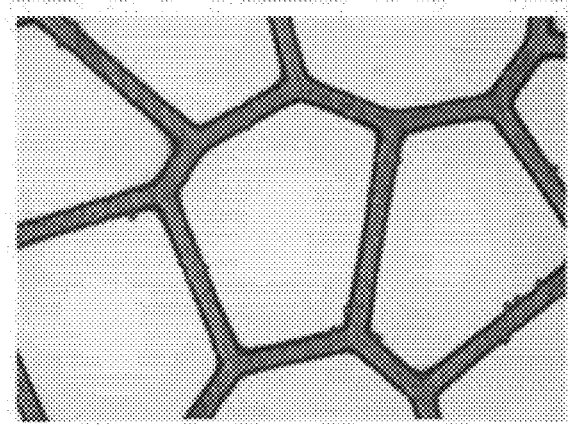
Figure 14C:
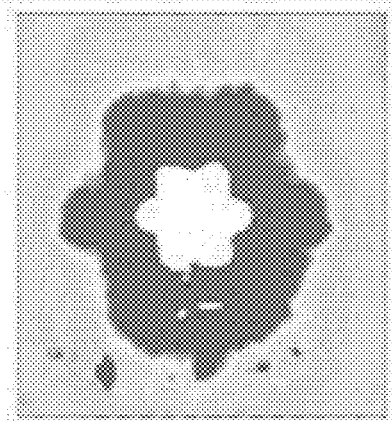

No diffraction line was qualitatively observed as a result of the diffraction evaluation, and the diffraction ratio measured by Equation 4 had a quantitative value of 27.4%. FIGS. 14A to 14C are diagrams showing an optical microscope image of 50 magnifications (FIG. 14A) and an optical microscope image of 200 magnifications (FIG. 14B) for the pattern film according to Example 5 of the present application, and the result of diffraction evaluation (FIG. 14C) thereon. Specifically, comprising a honeycomb-shaped spacer pattern comprising the ball spacer and the partition wall spacer and having irregularity of 70% was identified from the results of the optical microscope images, and no diffraction line was observed.

Example 6

A pattern film was formed in the same manner as in Example 5 except that the mask design (design in which a program is set so as to randomly move within a circular area having a radius of 50% (0.5 P) of the normal pitch) was changed.

The prepared partition wall spacer had a height of approximately 9.9 μm to 10.1 μm with an average of approximately 10.0 μm, and the line width was measured to be approximately 27 μm to 30 μm with an average of approximately 28.7 μm.

In addition, the ratio of the area having the spacer pattern present on the pattern film surface was approximately 19% to 20%. Herein, a standard deviation of the height of the spacer pattern was approximately 0.16 μm, and a standard deviation of the diameter of the ball spacer was approximately 0.75 μm. A ratio (T/D) of the line width (T) of the partition wall of the partition wall spacer and the average particle diameter (D) of the ball spacer was measured to be 2.87.

Figure 15A:
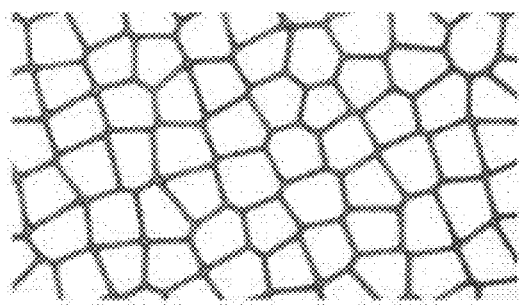
FIGS. 15A to 15C are diagrams showing an optical microscope image of 50 magnifications and an optical microscope image of 200 magnifications for pattern films according to Example 6 of the present application, and a result of diffraction evaluation thereon.
Figure 15B:
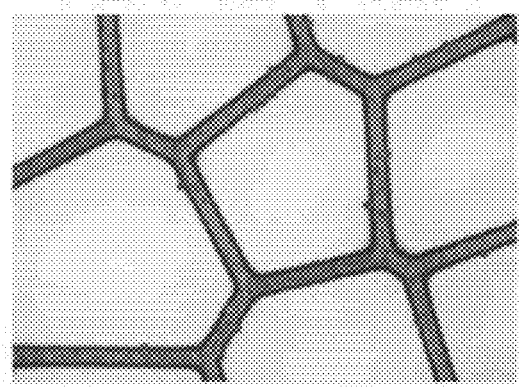
Figure 15C:
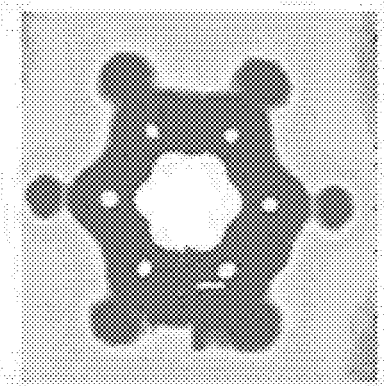

No diffraction line was qualitatively observed as a result of the diffraction evaluation, and the diffraction ratio measured by Equation 4 had a quantitative value of 28.0%. FIGS. 15A to 15C are diagrams showing an optical microscope image of 50 magnifications (FIG. 15A) and an optical microscope image of 200 magnifications (FIG. 15B) for the pattern film according to Example 6 of the present application, and the result of diffraction evaluation (FIG. 15C) thereon. Specifically, comprising a honeycomb-shaped spacer pattern comprising the ball spacer and the partition wall spacer and having irregularity of 50% was identified from the results of the optical microscope images, and no diffraction line was observed.

Comparative Example 3

A pattern film was formed in the same manner as in Example 5 except that the mask design (design in which the light shielding layer pattern is a regular pattern) was changed.

The prepared partition wall spacer had a height of approximately 9.9 μm to 10.1 μm with an average of approximately 10.0 μm, and the line width was measured to be approximately 27 μm to 30 μm with an average of approximately 28.8 μm.

In addition, the ratio of the area having the spacer pattern present on the pattern film surface was approximately 19% to 20%. Herein, a standard deviation of the height of the spacer pattern was approximately 0.16 μm, and a standard deviation of the diameter of the ball spacer was approximately 0.75 μm. A ratio (T/D) of the line width (T) of the partition wall of the partition wall spacer and the average particle diameter (D) of the ball spacer was measured to be 2.88.

Figure 16A:
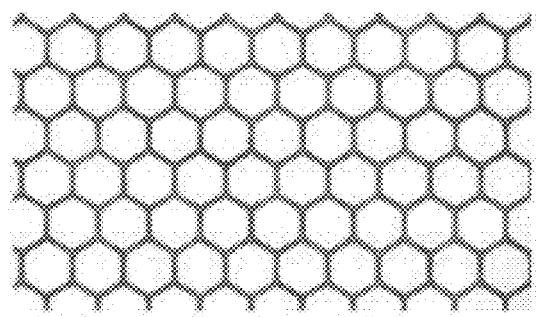
FIGS. 16A to 16C are diagrams showing an optical microscope image of 50 magnifications and an optical microscope image of 200 magnifications for pattern films according to Comparative Example 3 of the present application, and a result of diffraction evaluation thereon.
Figure 16B:
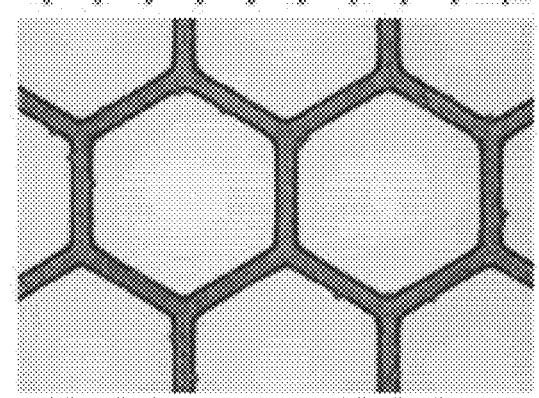
Figure 16C:
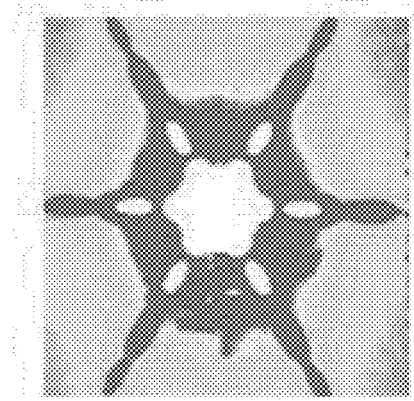

A diffraction line was clearly observed qualitatively as a result of the diffraction evaluation, and the diffraction ratio measured by Equation 4 had a quantitative value of 30.1%. FIGS. 16A to 16C are diagrams showing an optical microscope image of 50 magnifications (FIG. 16A) and an optical microscope image of 200 magnifications (FIG. 16B) for the pattern film according to Comparative Example 3 of the present application, and the result of diffraction evaluation (FIG. 16C) thereon. Specifically, comprising a spacer pattern comprising the ball spacer and the partition wall spacer and having a regular pattern (honeycomb) was identified from the results of the optical microscope images, and a diffraction line was clearly observed.

Example 7

A pattern film was formed in the same manner as in Example 5 except that the mask design (design in which the light shielding layer pattern has a space [pitch] of 940 μm) was changed.

The prepared partition wall spacer had a height of approximately 9.9 μm to 10.2 μm with an average of approximately 10.1 μm, and the line width was measured to be approximately 70 μm to 74 μm with an average of approximately 72.9 μm.

In addition, the ratio of the area having the spacer pattern present on the pattern film surface was approximately 14% to 15%. Herein, a standard deviation of the height of the spacer pattern was approximately 0.15 μm, and a standard deviation of the diameter of the ball spacer was approximately 0.75 μm. A ratio (T/D) of the line width (T) of the partition wall of the partition wall spacer and the average particle diameter (D) of the ball spacer was measured to be 7.29.

Figure 17A:
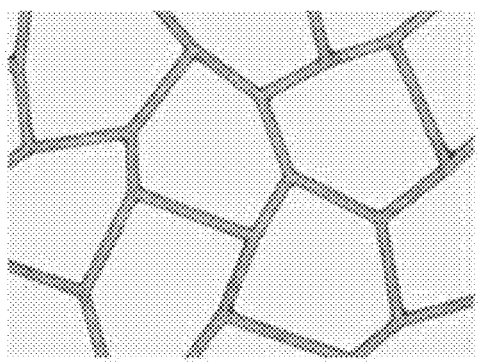
FIGS. 17A to 17C are diagrams showing an optical microscope image of 50 magnifications and an optical microscope image of 200 magnifications for pattern films according to Example 7 of the present application, and a result of diffraction evaluation thereon.
Figure 17B:
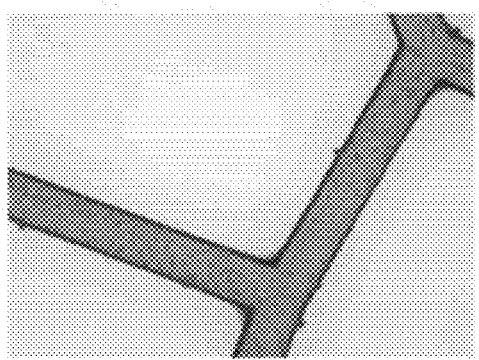
Figure 17C:
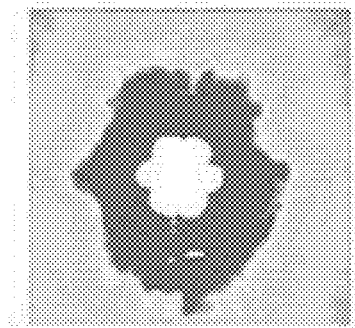

No diffraction line was qualitatively observed as a result of the diffraction evaluation, and the diffraction ratio measured by Equation 4 had a quantitative value of 21.3%. FIGS. 17A to 17C are diagrams showing an optical microscope image of 50 magnifications (FIG. 17A) and an optical microscope image of 200 magnifications (FIG. 17B) for the pattern film according to Example 7 of the present application, and the result of diffraction evaluation (FIG. 17C) thereon. Specifically, comprising a honeycomb-shaped spacer pattern comprising the ball spacer and the partition wall spacer and having irregularity of 70% was identified from the results of the optical microscope images, and no diffraction line was observed.

Example 8

A pattern film was formed in the same manner as in Example 5 except that the mask design (design in which a program is set so as to randomly move within a circular area having a radius of 50% (0.5 P) of the normal pitch and the light shielding layer pattern has a space [pitch] of 940 μm) was changed.

The prepared partition wall spacer had a height of approximately 9.9 μm to 10.1 μm with an average of approximately 10.0 μm, and the line width was measured to be approximately 71 μm to 74 μm with an average of approximately 72.8 μm.

In addition, the ratio of the area having the spacer pattern present on the pattern film surface was approximately 14% to 16%. Herein, a standard deviation of the height of the spacer pattern was approximately 0.16 μm, and a standard deviation of the diameter of the ball spacer was approximately 0.78 μm. A ratio (T/D) of the line width (T) of the partition wall of the partition wall spacer and the average particle diameter (D) of the ball spacer was measured to be 7.28.

Figure 18A:
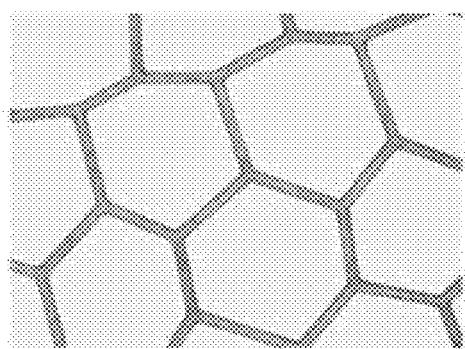
FIGS. 18A to 18C are diagrams each showing an optical microscope image of 50 magnifications and an optical microscope image of 200 magnifications for pattern films according to Example 8 of the present application, and a result of diffraction evaluation thereon.
Figure 18B:
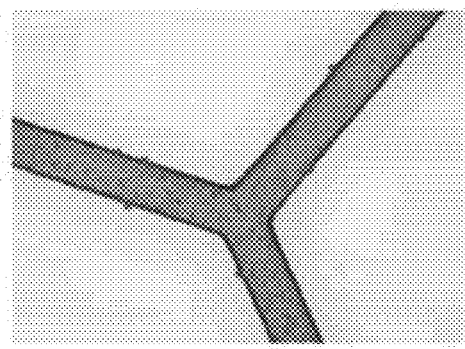
Figure 18C:
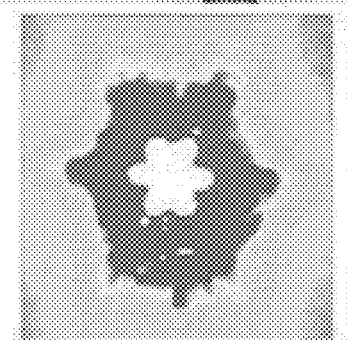

No diffraction line was qualitatively observed as a result of the diffraction evaluation, and the diffraction ratio measured by Equation 4 had a quantitative value of 21.9%. FIGS. 18A to 18C are diagrams showing an optical microscope image of 50 magnifications (FIG. 18A) and an optical microscope image of 200 magnifications (FIG. 18B) for the pattern film according to Example 8 of the present application, and the result of diffraction evaluation (FIG. 18C) thereon. Specifically, comprising a honeycomb-shaped spacer pattern comprising the ball spacer and the partition wall spacer and having irregularity of 50% was identified from the results of the optical microscope images, and no diffraction line was observed.

Comparative Example 4

A pattern film was formed in the same manner as in Example 5 except that the mask design (design in which the light shielding layer pattern is a regular pattern and the light shielding layer pattern has a space [pitch] of 940 μm) was changed.

The prepared partition wall spacer had a height of approximately 9.9 μm to 10.1 μm with an average of approximately 10.0 μm, and the line width was measured to be approximately 72 μm to 75 μm with an average of approximately 73.8 μm.

In addition, the ratio of the area having the spacer pattern present on the pattern film surface was approximately 14% to 16%. Herein, a standard deviation of the height of the spacer pattern was approximately 0.15 μm, and a standard deviation of the diameter of the ball spacer was approximately 0.80 μm. A ratio (T/D) of the line width (T) of the partition wall of the partition wall spacer and the average particle diameter (D) of the ball spacer was measured to be 7.83.

Figure 19A:
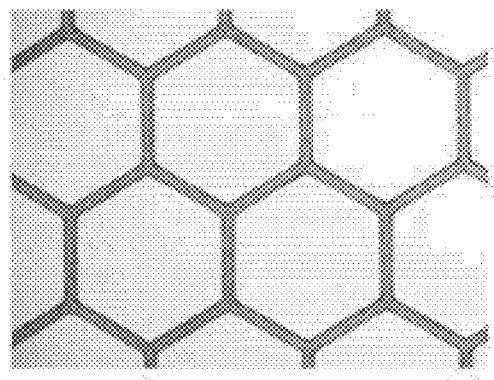
FIGS. 19A to 19C are diagrams showing an optical microscope image of 50 magnifications and an optical microscope image of 200 magnifications for pattern films according to Comparative Example 4 of the present application, and a result of diffraction evaluation thereon.
Figure 19B:
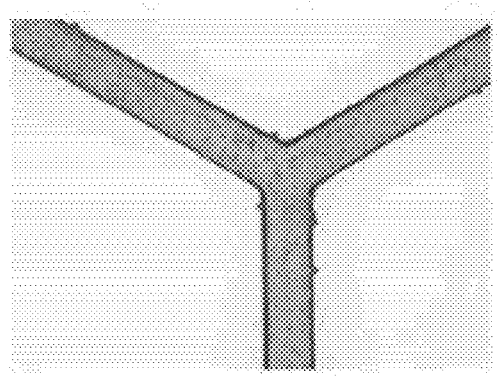
Figure 19C:

A diffraction line was clearly observed qualitatively as a result of the diffraction evaluation, and the diffraction ratio measured by Equation 4 had a quantitative value of 26.4%. FIGS. 19A to 19B are diagrams showing an optical microscope image of 50 magnifications (FIG. 19A) and an optical microscope image of 200 magnifications (FIG. 19B) for the pattern film according to Comparative Example 4 of the present application, and the result of diffraction evaluation (FIG. 19C) thereon. Specifically, comprising a spacer pattern comprising the ball spacer and the partition wall spacer and having a regular pattern (honeycomb) was identified from the results of the optical microscope images, and a diffraction line was clearly observed.

As seen from Examples 1 to 8 and Comparative Examples 1 to 4, it was identified that, in the pattern film according to one embodiment of the present application, the spacer pattern included a partition wall spacer and a ball spacer, and by the spacer dot forming the spacer pattern having irregularity of 50% or greater, the pattern structure was expanded to comprise various patterns from one type of pattern of existing tetragon (mesh) or hexagon (honeycomb) by introducing pattern irregularity while maintaining a cell gap, and by introducing irregularity, the transmittance variable device comprising the same had properties of excellent visibility with reduced diffused reflection since a diffraction phenomenon was improved.

Specifically, the present application may be divided into Example 1, Example 2 and Comparative Example 1 (Constitution 1)/Example 3, Example 4 and Comparative Example 2 (Constitution 2)/Example 5, Example 6 and Comparative Example 3 (Constitution 3)/Example 7, Example 8 and Comparative Example 4 (Constitution 4). Constitutions 1 to 4 were each formed with different pitch and spacer pattern shapes, and Constitution 1 to 4 each had irregularity adjusted to 70%, 50% and 0% to constitute the examples and the comparative examples.

In each of the constitutions having different pitch and spacer pattern shapes, it was identified that the pattern film forming the spacer pattern by adjusting spacer dot irregularity to 70% and 50% was able to significantly improve a diffraction phenomenon compared to the pattern film forming the spacer pattern by adjusting spacer dot irregularity to 0% (regular pattern), and the transmittance variable device comprising the same afterward had significantly improved visibility by reducing diffused reflection.

The invention claimed is:

1. A pattern film, comprising:
a base layer; and
a spacer pattern formed on the base layer,
wherein the spacer pattern comprises a partition wall spacer and a ball spacer,
wherein the partition wall spacer comprises a plurality of spacer dots and a spacer line connecting the spacer dots,
wherein the ball spacer is one of embedded in, partially embedded in, or in contact with the partition wall spacer,
wherein, when any 3 or more spacer dots are selected among the plurality of spacer dots, the spacer line forms a closed figure having the selected spacer dots at the vertices thereof, wherein the selected spacer dots are not present inside the closed figure,
wherein a length of at least one side of the closed figure is different from the lengths of the remaining sides,
wherein each spacer dot in the plurality has irregularity of 50% or greater,
wherein a rectangular 200×200 pixel area is set based on an area of the pattern film through which light passes from an LED light source, and
wherein, using a lower left end corner of the rectangular 200×200 pixel area as x axis, y axis (0,0), the rectangular 200×200 pixel area of (0,0) to (200,200) satisfies the following Equation 3:

$$2 \leq D1-D2(\%) \leq 10 \quad \text{[Equation 3]}$$

in Equation 3, D1 is a diffraction ratio when the spacer dot of the pattern film has irregularity of 0%; D2 is a diffraction ratio when the spacer dot of the pattern film has irregularity of 70%; and each diffraction ratio satisfies the following Equation 4:

$$[1-Sc/S] \times 100(\%) \quad \text{[Equation 4]}$$

in Equation 4, S is a total amount of light in the rectangular 200×200 pixel area of (0,0) to (200,200); and Sc is an amount of pixel light in an area having pixels employing (100,100) as an origin and having a radius of 50 in the rectangular 200×200 pixel area of (0,0) to (200,200).

2. The pattern film of claim 1, wherein a line width (T) of the partition wall of the partition wall spacer and an average particle diameter (D) of the ball spacer satisfy the following Equation 1:

$$1.0 \leq T/D \leq 20 \quad \text{[Equation 1]}.$$

3. The pattern film of claim 1, wherein the base layer is an inorganic base layer or an organic base layer.

4. The pattern film of claim 1, wherein the spacer pattern has optical density of 0.4 or greater and 4 or less.

5. The pattern film of claim 1, wherein the spacer pattern has a line width of 10 μm or greater and 200 μm or less.

6. The pattern film of claim 1, wherein a total area (A) of the base layer and an area (B) of the surface of the base layer in contact with the spacer pattern satisfy the following Equation 2:

$$5 \leq [B/A] \times 100(\%) \leq 30 \quad \text{[Equation 2]}.$$

7. The pattern film of claim 1, wherein an average value of a height of the partition wall spacer is 2 μm or greater and 100 μm or less, and a standard deviation of the height of the partition wall spacer is 0.05 μm or greater and 0.5 μm or less.

8. The pattern film of claim 1, wherein a standard deviation of a particle diameter of the ball spacer is 0.8 μm or less.

9. The pattern film of claim 1, wherein less than 85% of the sides of the closed figure have the same length.

10. A method for manufacturing the pattern film of claim 1, the method comprising:
forming an ultraviolet curable resin layer comprising a ball spacer on one surface of a base layer;
laminating a film mask on the ultraviolet curable resin layer;
irradiating the ultraviolet curable resin layer with ultraviolet light through the film mask;
peeling the film mask from the ultraviolet curable resin layer after the irradiation; and
peeling an uncured area of the ultraviolet curable resin layer after the irradiation.

11. A transmittance variable device, comprising:
the pattern film of claim 1; and
a substrate disposed opposite to the pattern film,
wherein the base layer of the pattern film and the substrate are separated by a space, and
wherein the space is maintained by the spacer pattern of the pattern film.

12. The transmittance variable device of claim 11, comprising an adhesive layer disposed between the pattern film and the substrate, wherein the adhesive layer has a vertical alignment force.

* * * * *